Dec. 11, 1928.
H. MARCUSON
COFFEE URN
Filed Feb. 23, 1928
1,694,548
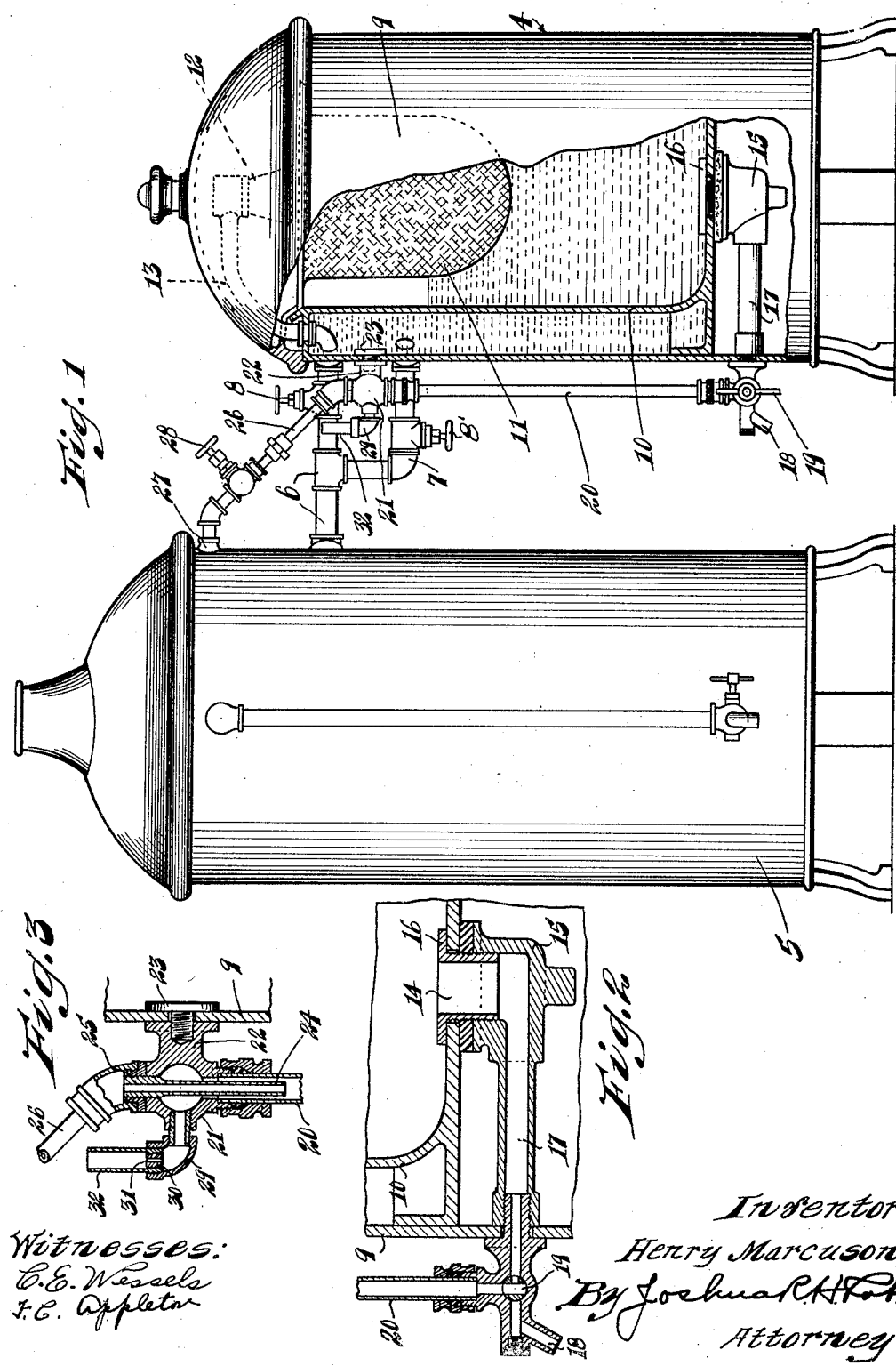
Inventor
Henry Marcuson,
By Joshua R. H. Roth
Attorney
Witnesses:
C. E. Wessels
J. C. Appleton Patented Dec. 11, 1928.

1,694,548

UNITED STATES PATENT OFFICE.

HENRY MARCUSON, OF CHICAGO, ILLINOIS.

COFFEE URN.

Application filed February 23, 1928. Serial No. 256,154.

My invention relates to an improvement in coffee urns, and has for its object the provision of means for using steam to stir up the coffee in the coffee jar, thus obviating the necessity for drawing off some of the coffee and repouring it through the top in order to attain the desired strength.

A further object is to utilize the steam from the hot water urn which is used in connection with the coffee urn to stir the coffee in said urn.

The invention is suitable for use with two urn or three urn batteries or combinations of two urn or three urn batteries.

The invention will be best understood by reference to the accompanying drawings which form a part of this specification, and in which, Figure 1 shows my invention used with a two urn battery, the hot water urn and coffee urn being shown in elevation with a portion of the outer shell of the coffee urn and of the coffee jar broken away to show the interior arrangement.

Figure 2 is a section on the line 2—2 of Figure 1.

Figure 3 is a section on the line 3—3 of Figure 1.

In the preferred form of my invention, as illustrated in the drawings, 5 is the hot water urn used to supply hot water for making the coffee and for the hot water jacket which maintains the coffee at a proper temperature. The hot water for making the coffee is supplied through the pipe 6, and for filling the hot water jacket, through the by-pass 7, the flow of water through the pipes 6 and 7 being controlled by valves 8 and 8' respectively.

The coffee urn 4 is of the usual form having an outer shell 9 within which is positioned a coffee jar 10. Between the coffee jar 10 and the outer shell 9 is a hot water jacket. The bag or strainer 11 for coffee grounds is supported in the upper part of the coffee jar 10. Above the bag 11 is positioned a spray head 12 which is supplied with hot water through the pipes 6 and 13 from the hot water urn 5. The coffee jar 10 is provided with a vent 14 in the bottom thereof. This vent 14 is connected by means of a reducing elbow 15, interiorly screw threaded, and a flange bushing 16, threaded for engagement with said elbow 15, to the pipe 17, which pierces the shell 9 and terminates in a vent 18 through which the coffee may be drawn from the jar 10. The vent 18 is closed by the hand operated valve 19 so that the coffee may be drawn as required.

Above the valve 19 is positioned a coffee gauge for indicating the depth of coffee within the jar, which consists of a glass tube 20 communicating through the valve 19 and the pipe 17 with the coffee jar 10. The upper end of the tube 20 is connected with one arm of a T 21 having a spheroidal hollow body which is supported by a bracket 22, the latter being secured to the urn 4 by means of a bolt 23 from the inside of the shell 9. The opposite arm of the T 21 is interiorly threaded and supports a delivery tube 24 of smaller diameter than the glass tube 20, having an enlarged exteriorly threaded portion 25 at one end thereof by means of which it is secured to the T 21. The delivery tube 24 extends downwardly through the hollow body of the T 21 into the upper end of the tube 20. The enlarged portion 25 of the delievery tube 24 extends somewhat beyond the T 21, and to it is secured a pipe 26 by means of suitable fittings, which is connected to a suitable source of steam. In the preferred form here illustrated the pipe 26 is connected, by fittings and elbows suitable to maintain it at an angle 45°, to an aperture 27 especially made therefor in the wall of the hot water urn 5 above the level of the water therein. The pipe 26 is provided with a valve 28 to control the supply of steam to the coffee gauge 20.

The lateral arm of the T 21 is fitted with an elbow 29 the upper end of which is closed by a plug 30 in which is made a small aperture 31. Surrounding this aperture and extending a short distance above it is a collar 32 of much greater diameter than the hole 31 and open at the top. The hole 31 provides an opening to equalize the pressure necessary for the proper functioning of the coffee gauge 20.

In use ground coffee is placed in the bag 11 and hot water sprayed over it from the hot water urn 5 by operation of the valve 8 which percolates through the coffee grounds and runs into the coffee jar 10. Hot water is also supplied to fill the jacket by the operation of the valve 8'. As the liquid in the coffee jar 10 rises, it fills the tube 20 also to an equal depth, the air in the tube escaping through the aperture 31. The coffee jar is filled until the height of liquid in the tube 20 indicates that the jar 10 has been filled as required. When it is desired to stir up the coffee to equalize the strength thereof, or to increase the strength by again percolating it through the bag 11, the valve 28 is opened allowing steam to pass from the upper part of the hot water urn through the pipe 26 and the delivery tube 24 into the tube 20, thereby forcing the coffee in the tube 20 back through the valve 19, pipe 17 and vent 14 into the coffee jar 10 where the steam causes the coffee contained therein to swirl around, thereby mixing it and causes it to percolate again through the bag 11. Some of the steam will escape through the aperture 31, and for this reason the collar 32 is provided, it being of sufficient height to cause the condensation of any steam which does escape, thereby preventing the water so produced from dripping down and marring or soiling the urn or the stand on which it rests.

It is obvious that my invention might be applied so as to utilize any other convenient source of steam than the steam in the upper part of the hot water urn 5, or any source of pressure, as compressed air, equally well.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modification as lie within the scope of the appended claims.

What I claim as new and desire to secure by Letters Patent is:

1. In combination with a coffee urn having an exterior coffee gauge, a T having the lower arm connected to the upper end of said gauge, the upper arm connected to a source of steam or other pressure exterior to said coffee urn; the third arm connected to an upturned pressure vent having a collar surrounding said vent and extending thereabove; and a delivery tube positioned in the upper arm of said T and extending therethrough into the upper end of said coffee gauge, substantially as described.

2. In combination with a coffee urn having an exterior coffee gauge and adapted for use with a separate hot water urn, a T having the lower arm connected to said coffee gauge; the upper arm thereof connected to the upper part of said hot water urn, and provided with a valve; the third arm of said T connected to an upturned pressure vent having a collar surrounding and extending above the same; and a delivery tube positioned in the upper arm of said T, and extending therethrough into the upper end of said coffee gauge, substantially as described.

3. In combination with a gauge glass having a vent at the top thereof, of a collar around said vent adapted to prevent moisture condensed from escaping steam from soiling said gauge, substantially as described.

4. In combination with a coffee urn having an exterior coffee gauge and adapted for use with a separate hot water urn, means for connecting the steam from said hot water urn to the top of said gauge including a T with a steam delivery tube passing therethrough, and a vent surrounded by a collar adapted to prevent moisture condensed from escaping steam from soiling said gauge, substantially as described.

In testimony whereof I have signed my name to this specification.

HENRY MARCUSON.